United States Patent
Ando (10) Patent No.: US 9,213,502 B2
(45) Date of Patent: Dec. 15, 2015

(54) INFORMATION PROCESSING APPARATUS, INFORMATION PROCESSING METHOD, AND NON-TRANSITORY COMPUTER READABLE MEDIUM FOR RECORDING PRINTING INFORMATION

(71) Applicant: FUJI XEROX Co., Ltd., Minato-ku, Tokyo (JP)

(72) Inventor: Toshiaki Ando, Kanagawa (JP)

(73) Assignee: FUJI XEROX CO., LTD, Tokyo (JP)

( * ) Notice: Subject to any disclaimer, the term of this patent is extended or adjusted under 35 U.S.C. 154(b) by 0 days.

(21) Appl. No.: 14/276,430

(22) Filed: May 13, 2014

(65) Prior Publication Data

US 2014/0376038 A1    Dec. 25, 2014

(30) Foreign Application Priority Data

Jun. 24, 2013 (JP) ................................. 2013-131345

(51) Int. Cl.
*G06F 3/12*     (2006.01)
*G06Q 30/02*    (2012.01)
*G06K 15/00*    (2006.01)

(52) U.S. Cl.
CPC ............ *G06F 3/1206* (2013.01); *G06F 3/1243* (2013.01); *G06F 3/1292* (2013.01); *G06Q 30/02* (2013.01)

(58) Field of Classification Search
CPC ..................................................... G06Q 30/02

USPC ................ 358/1.1, 1.9, 1.14, 1.15, 1.18, 402; 382/100, 102

See application file for complete search history.

(56) References Cited

U.S. PATENT DOCUMENTS 6,484,149 B1 *  11/2002  Jammes et al. ............. 705/26.62
8,717,633 B2 *   5/2014  Tomizawa et al. ........... 358/3.26

FOREIGN PATENT DOCUMENTS

JP     2008-112377 A      5/2008
JP     2011-242999 A     12/2011

* cited by examiner

*Primary Examiner* — Gabriel Garcia
(74) *Attorney, Agent, or Firm* — Sughrue Mion, PLLC (57) ABSTRACT

An information processing apparatus includes an identifier generation unit that generates an identifier unique to a combination of, at least, destination information of a destination of printed matter and content information related to part of content to be printed on the printed matter, an address generation unit that generates an address including the identifier generated by the identifier generation unit, a print information generation unit that generates print information that is to be printed on the printed matter and includes the destination information, the content information, and the address generated by the address generation unit, and a recording unit that in an associated form records the destination information, the content information, the identifier, and process result information related to the print information that is processed subsequent to printing of the printed matter.

14 Claims, 11 Drawing Sheets

| ACCESS CODE | CUSTOMER IDENTIFICATION CODE | PRODUCT IDENTIFICATION CODE | PRINT DATE | PRINTED MATTER IDENTIFICATION CODE | LAYOUT IDENTIFICATION CODE |
|---|---|---|---|---|---|
| 100200030001 | A0021 | m0032 | 1/28/2012 | DM00123 | A-1 |
| 100200030002 | A0021 | m0039 | 1/28/2012 | DM00123 | A-2 |
| 100200030003 | A0021 | m0074 | 1/28/2012 | DM00123 | B-1 |
| 100200030004 | A0021 | m0251 | 1/28/2012 | DM00123 | B-2 |
| 100200030005 | A0033 | m0018 | 2/20/2012 | DM00211 | E-1 |
| 100200030006 | A0033 | m0039 | 2/20/2012 | DM00211 | E-2 |
| 100200030007 | A0033 | m0081 | 2/20/2012 | DM00211 | E-3 |
| 100200030008 | — | — | — | — | — |
| 100200030009 | — | — | — | — | — |
| 100200030010 | — | — | — | — | — |

| ACCESS CODE | CUSTOMER IDENTIFICATION CODE | PRODUCT IDENTIFICATION CODE | PRINT DATE | PRINTED MATTER IDENTIFICATION CODE | LAYOUT IDENTIFICATION CODE |
|---|---|---|---|---|---|
| 100200030001 | A0021 | m0032 | 1/28/2012 | DM00123 | A-1 |
| 100200030002 | A0021 | m0039 | 1/28/2012 | DM00123 | A-2 |
| 100200030003 | A0021 | m0074 | 1/28/2012 | DM00123 | B-1 |
| 100200030004 | A0021 | m0251 | 1/28/2012 | DM00123 | B-2 |
| 100200030005 | A0033 | m0018 | 2/20/2012 | DM00211 | E-1 |
| 100200030006 | A0033 | m0039 | 2/20/2012 | DM00211 | E-2 |
| 100200030007 | A0033 | m0081 | 2/20/2012 | DM00211 | E-3 |
| 100200030008 | A0042 | m0021 | 3/2/2012 | DM00401 | E-1 |
| 100200030009 | A0042 | m0091 | 3/2/2012 | DM00401 | E-2 |
| 100200030010 | A0042 | m0122 | 3/2/2012 | DM00401 | E-3 |

| ACCESS CODE | CUSTOMER IDENTIFICATION CODE | PRODUCT IDENTIFICATION CODE | ACCESS TYPE | DETAILED INFORMATION ACCESS CODE | PRINT DATE | PRINTED MATTER IDENTIFICATION CODE | LAYOUT IDENTIFICATION CODE |
|---|---|---|---|---|---|---|---|
| 100200030001 | A0021 | m0032 | SUMMARY | 200200030001 | 1/28/2012 | DM00123 | A-1 |
| 200200030001 | A0021 | m0032 | DETAIL | | | | |
| 100200030002 | A0021 | m0039 | SUMMARY | 200200030002 | 1/28/2012 | DM00123 | A-2 |
| 200200030002 | A0021 | m0039 | DETAIL | | | | |
| 100200030003 | A0021 | m0074 | SUMMARY | 200200030003 | 1/28/2012 | DM00123 | B-1 |
| 200200030003 | A0021 | m0074 | DETAIL | | | | |
| 100200030004 | A0021 | m0251 | SUMMARY | 200200030004 | 1/28/2012 | DM00123 | B-2 |
| 200200030004 | A0021 | m0251 | DETAIL | | | | |
| ... | ... | ... | ... | ... | ... | ... | ... |

| ACCESS CODE | LATEST ACCESS TIME AND DATE | ACCESS COUNT |
|---|---|---|
| 100200030004 | 2/28/2012 18:32 | 3 |
| 200200030004 | 2/28/2012 18:20 | 1 |
| 100200030005 | 2/28/2012 20:26 | 1 |
| 100200030006 | 2/28/2012 20:35 | 2 |
| ⋮ | ⋮ | ⋮ |

INFORMATION PROCESSING APPARATUS, INFORMATION PROCESSING METHOD, AND NON-TRANSITORY COMPUTER READABLE MEDIUM FOR RECORDING PRINTING INFORMATION

CROSS-REFERENCE TO RELATED APPLICATIONS

This application is based on and claims priority under 35 USC 119 from Japanese Patent Application No. 2013-131345 filed Jun. 24, 2013.

BACKGROUND

Technical Field

The present invention relates to an information processing apparatus, an information processing method, and a non-transitory computer readable medium.

SUMMARY

According to an aspect of the invention, there is provided an information processing apparatus including an identifier generation unit that generates an identifier unique to a combination of, at least, destination information of a destination of printed matter and content information related to part of content to be printed on the printed matter, an address generation unit that generates an address including the identifier generated by the identifier generation unit, a print information generation unit that generates print information that is to be printed on the printed matter and includes the destination information, the content information, and the address generated by the address generation unit, and a recording unit that records in an associated form the destination information, the content information, the identifier, and process result information related to the print information that is processed subsequent to printing of the printed matter.

BRIEF DESCRIPTION OF THE DRAWINGS

Exemplary embodiments of the present invention will be described in detail based on the following figures, wherein.

DETAILED DESCRIPTION

Figure 1:
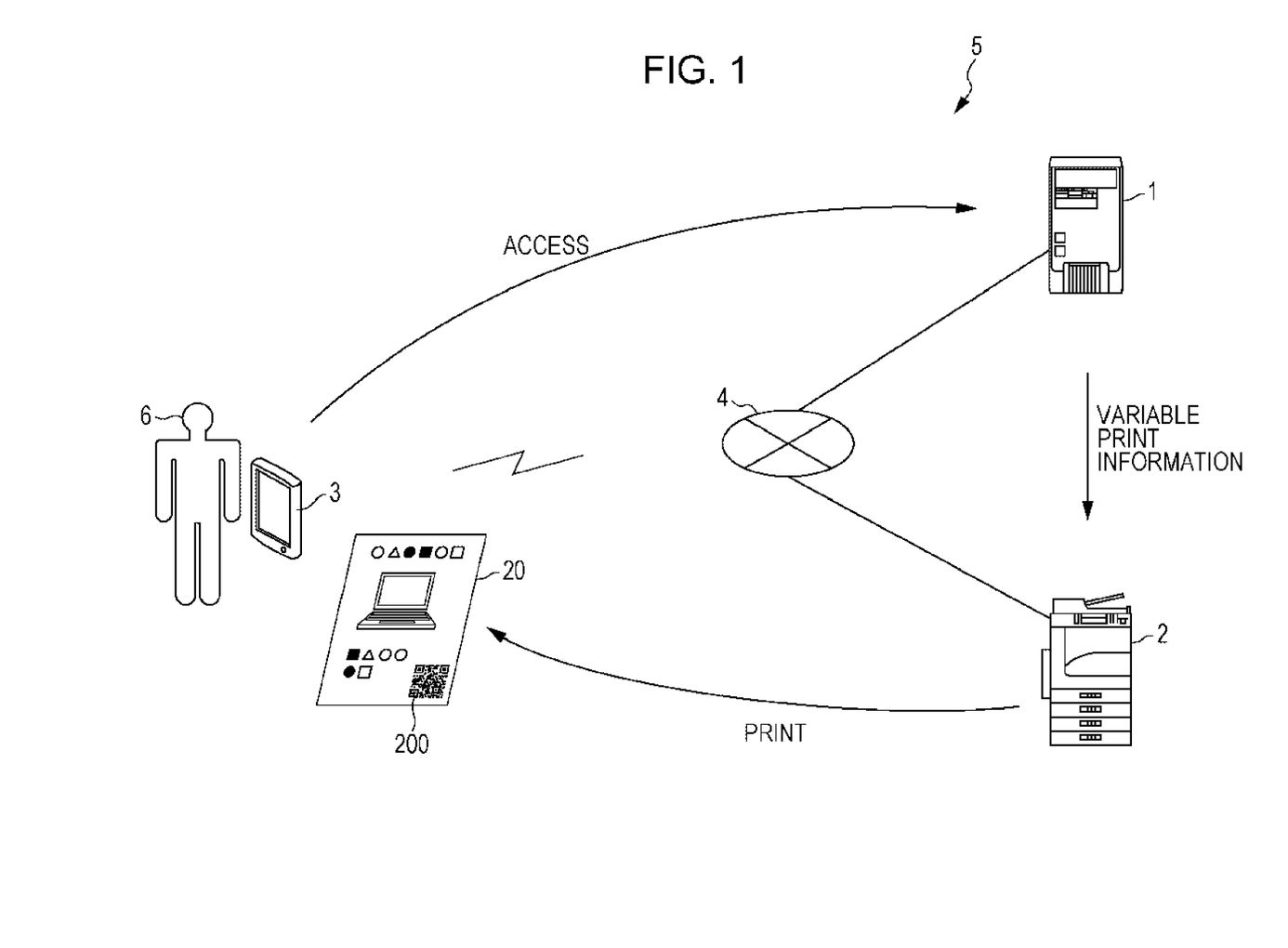
FIG. 1 illustrates an example of a configuration of an image processing system of an exemplary embodiment.

FIG. 1 is a block diagram diagrammatically illustrating a configuration of an information processing system 5 of an exemplary embodiment.

The information processing system 5 includes an information processing apparatus 1, a printer 2, and a terminal apparatus 3, connected to be in communication with each other via a network 4. A single printer 2 and a single terminal apparatus 3 are illustrated in FIG. 1, but multiples printers 2 and terminal apparatuses 3 may also be connected.

The information processing apparatus 1 includes electronic components, such as a central processing unit (CPU) and a flash memory, having information processing functions. In one operation example, printed matter 20 such as for a direct mail to introduce a product to each customer is printed by the printer 2. To this end, the information processing apparatus 1 generates information having contents to introduce products different from customer to customer (hereinafter referred to as "variable print information") and transmits the variable print information to the printer 2 for printing (hereinafter referred to as "variable printing").

The variable printing is performed on pages to be printed on a page by page basis using a layout of print contents, such as text, line drawings, and image (hereinafter referred to as a "template") based on data variable on a per customer basis (hereinafter referred to as "variable information").

A user 6 as a customer may request access to a web page indicating detailed information of products using the terminal apparatus 3 in accordance with a code 200 printed on the printed matter 20. In response, the information processing apparatus 1 transmits the web page including contents of the products to the terminal apparatus 3. The information processing apparatus 1 also records information about time of printing of the printed matter 20, and information fed back, such as time and date of the access that has been performed in accordance with the code 200 of the customer who has received the printed matter 20 (hereinafter referred to as "feedback information").

The printer 2 has a function of processing and printing at least print information (hereinafter referred to as a "printing process"). The printer 2 includes electronic components, such as a CPU and a non-volatile memory, having a function of processing information. The printer 2 generates the printed matter 20 by performing the printing process on a paper sheet in accordance with variable print information outputted by the information processing apparatus 1. The variable print information herein is a type of print information. A variable print information generation unit 103 described below generates the variable print information by combining variable information 114 and template information 115. The printer 2 may have a scanner function, a copying function, and a facsimile function.

The terminal apparatus 3 is an information processing apparatus, such as a cell phone or a tablet-type device. The terminal apparatus 3 includes electronic components, such as a CPU and a flash memory, having a function of processing information. The terminal apparatus 3 has at least a function of reading the code 200, extracting an address from the code 200, and accessing the information processing apparatus 1 using the address.

The network 4 is a communication network permitting high-speed communications. For example, the network 4 is a private communication network, such as Intranet or a local area network, or a public communication network, such as the Internet, and may be wired or wireless network.

Configuration of Information Processing Apparatus

Figure 2:
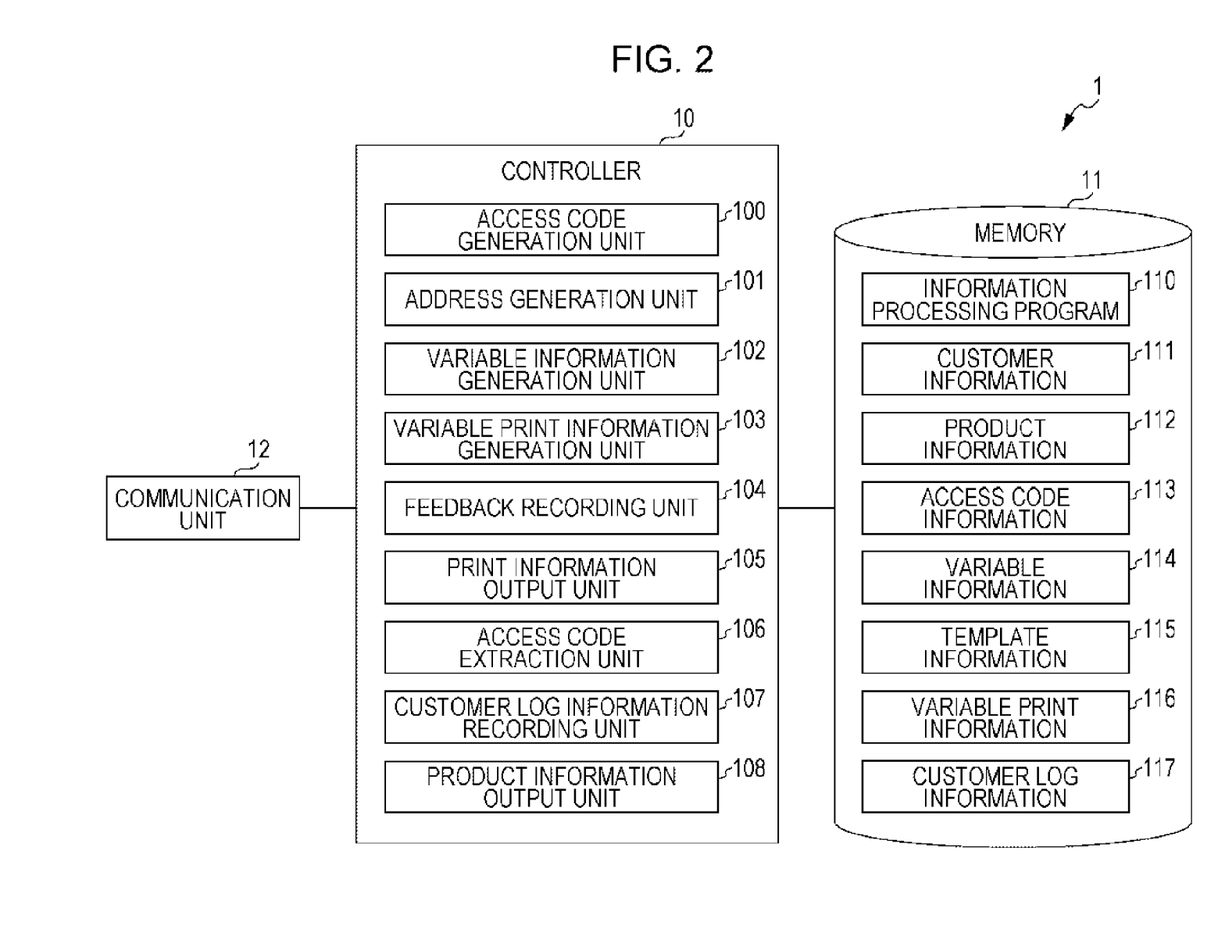
FIG. 2 is a block diagram diagrammatically illustrating a configuration of an information processing apparatus of the exemplary embodiment.

FIG. 2 is a block diagram illustrating a configuration of the information processing apparatus 1 of the exemplary embodiment.

The information processing apparatus 1 includes a CPU to control each element therewithin. The information processing apparatus 1 also includes the controller 10 configured to control elements in the information processing apparatus 1 and to execute a variety of programs, a memory 11 including a storage medium, such as a flash memory, configured to store information, and a communication unit 12 configured to communicate with the outside via the network 4.

By executing a information processing program 110 to be discussed later, the controller 10 functions as an access code generation unit 100, an address generation unit 101, a variable information generation unit 102, a variable print information generation unit 103, a feedback recording unit 104, a print information output unit 105, an access code extraction unit 106, a customer log information recording unit 107, and a product information output unit 108.

The access code generation unit 100 is an identifier generation unit that generates an access code, such as "100200030001" as an identifier unique to each piece of customer information 111 and unique to each piece of product information 112. Even if a combination of the same customer information 111 and the same product information 112 was present in the past, an access code unique to the same customer information 111 and the same product information 112 but different from the past unique code is generated. The access code generation unit 100 records the generated access code on access code information 113.

As an address, the address generation unit 101 generates a uniform resource identifier (URI), such as "http://server.com/personalized.asp?100200030001" including information of the access code. The term "uniform resource identifier (URI)" corresponds to an address over the Internet and points to a location where a resource is present over the Internet. The URI includes a uniform resource locator (URL). The URL is information that is used to gain access to the contents of a product. For example, the URL is used to access a web page that displays the contents of the product. The access code "100200030001" is directly included in the URL. Alternatively, the access code may be encoded using a predetermined encoding method, and the encoded access code may be then included in the address. In such a case, the access code may be obtained by decoding the address in accordance with the predetermined encoding method.

The variable information generation unit 102 generates variable information 114 by combining the customer information 111 and product information 112. The customer information 111 includes information related to a destination of the printed matter 20 including at least a name and an addressee (hereinafter referred to as "destination information"). The customer information 111 includes, besides the destination information, a customer identification code, a mail address, and a message addressed to the customer. The product information 112 includes information related to contents, such as, at least an image and text printed on the printed matter 20 (hereinafter referred to as "content information"), excluding information printed on the printed matter 20 in accordance with the destination information. More specifically, the product information 112 includes image information of the product and text information of product guide.

The variable print information generation unit 103 generates variable print information 116 by combining variable information 114 and template information 115.

The feedback recording unit 104 records on the access code information 113 a printing process result of the variable print information 116 as an example of feedback information to be fed back. The printing process result is information related to printing in which the printer 2 has printed the variable print information 116. For example, the printing process result includes information related to the time and date of the printing performed by the printer 2, an identification code of the printed matter, and an identification code of a layout of printed contents. The printing process result includes one or more pieces of the information. The printing time and date may be any printing time and date within a range from the time and date on which the print information output unit 105 outputs the variable print information 116 to the printer 2 to the time and date on which the printer 2 actually completes the printing. The printing time and date may be determined based on the time and date on which any apparatus confirms that the variable print information 116 is output to the printer 2 or that the printer 2 has performed the printing.

The print information output unit 105 outputs the variable print information 116 to the printer 2.

When the terminal apparatus 3 accesses the information processing apparatus 1 using a given address, the access code extraction unit 106 extracts an access code from the address.

The customer log information recording unit 107 records on the customer log information 117 an access log of a customer corresponding to the access code extracted by the access code extraction unit 106.

The product information output unit 108 generates a web page based on the product information 112 of a product corresponding to the access code extracted by the access code extraction unit 106 and then outputs the web page to the terminal apparatus 3. Note that the web page may be the one produced in advance.

The controller 10 may include, at least, the access code generation unit 100, the address generation unit 101, the feedback recording unit 104, the access code extraction unit 106, and the customer log information recording unit 107 and the functions of the remaining elements may be executed by an external apparatus.

In order to cause the controller 10 to operate as the access code generation unit 100 through the product information output unit 108, the memory 11 stores information processing program 110, customer information 111, product information 112, access code information 113, variable information 114, template information 115, variable print information 116, and customer log information 117.

The customer information 111 and the product information 112 may be retrieved from an external database.

Figure 3:
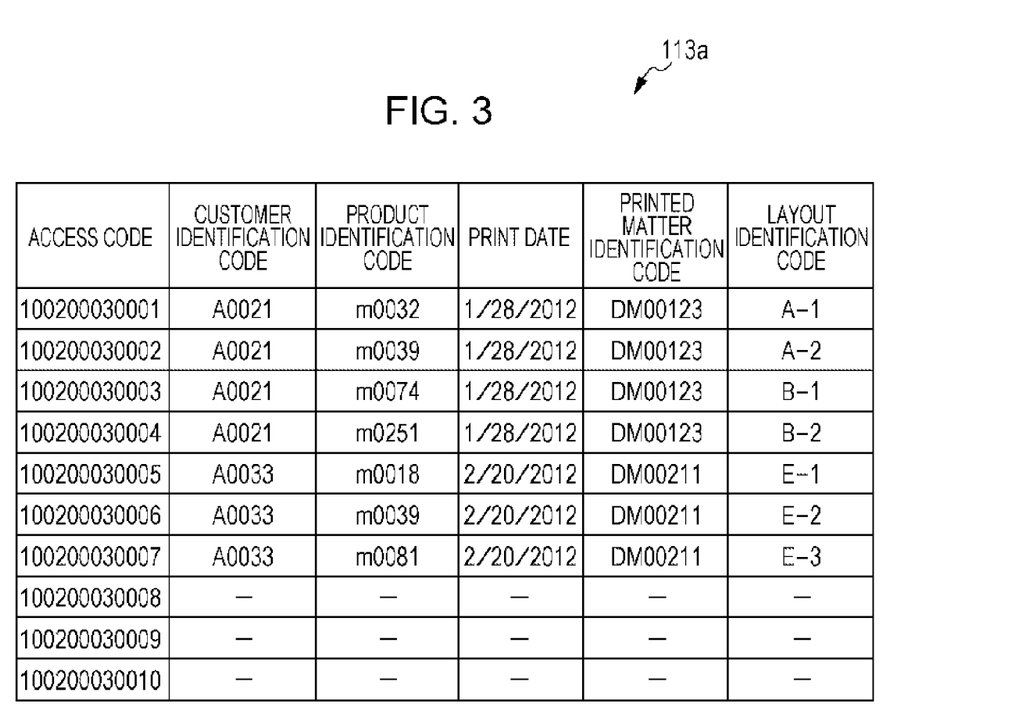
FIG. 3 diagrammatically illustrates an example of a structure of access code information.

FIG. 3 diagrammatically illustrates an example of a structure of the access code information 113.

Access code information 113a includes an access code generated by the access code generation unit 100, a customer identification code corresponding to the customer information 111, a product identification code corresponding to the product information 112, printing time and date on which the printer 2 has printed the variable print information 116 including the access code, a printed matter identification code identifying the printed matter, and a layout identification code indicating a location where the product information 112 is laid out.

Figure 4:
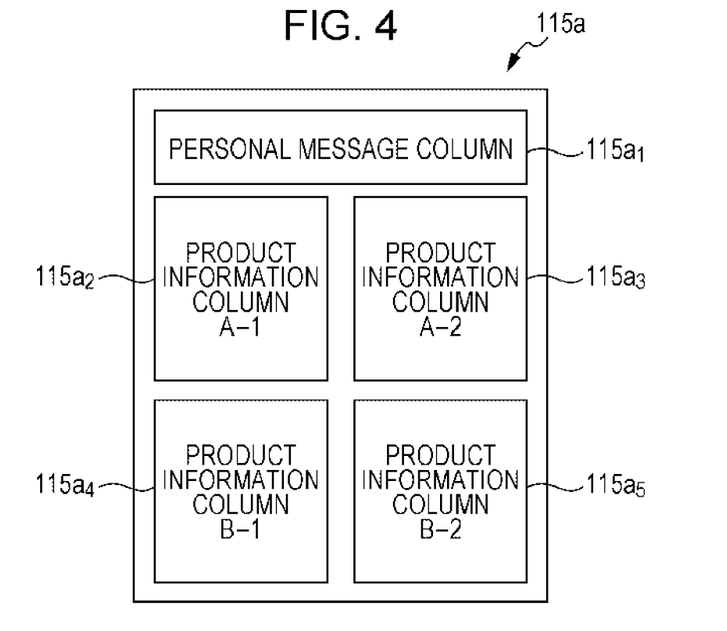
FIG. 4 diagrammatically illustrates an example of a structure of template information.

FIG. 4 diagrammatically illustrates an example of a structure of the template information 115.

Template information 115a includes a personal message column $115a_1$ receiving text different from customer to customer and product information columns $115a_2$ through $115a_5$ receiving information of product recommended to the customer.

Figure 5:
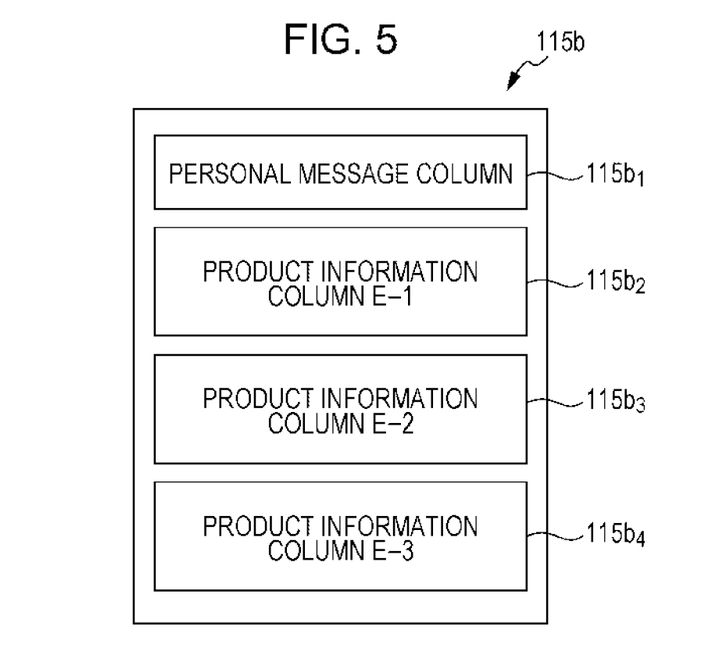
FIG. 5 diagrammatically illustrates another example of the structure of the template information.

FIG. 5 diagrammatically illustrates another example of the structure of the template information 115.

Template information 115b is different in layout from the template information 115a, and includes a personal message column $115b_1$ and product information columns $115b_2$ through $115b_4$.

Figure 6:
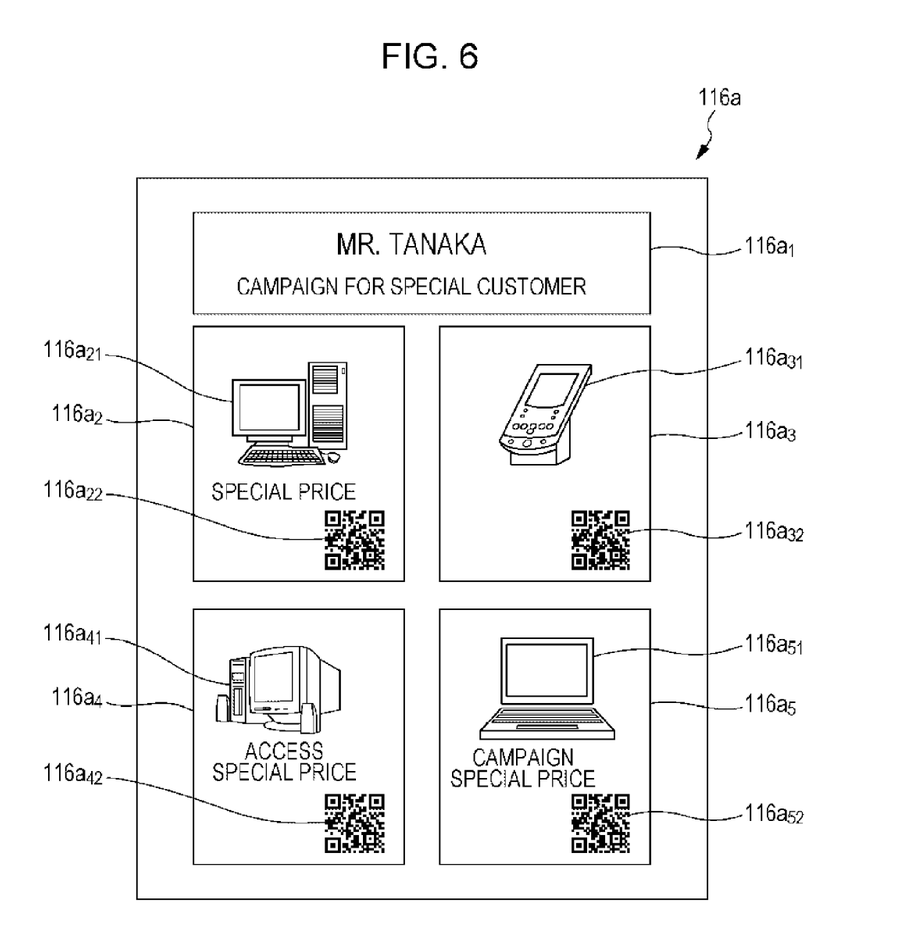
FIG. 6 diagrammatically illustrates an example of a structure of variable print information.

FIG. 6 diagrammatically illustrates an example a structure of the variable print information 116.

Variable print information 116a is generated using the template information 115a of FIG. 4 based the variable information 114 corresponding to a given customer. The variable print information 116a includes a personal message column $116a_1$ having a message "Mr. Tanaka Campaign for special customer", and product information columns $116a_2$, $116a_3$, $116a_4$, and $116a_5$. The product information columns $116a_2$, $116a_3$, $116a_4$, $116a_5$ respectively contain product information $116a_{21}$, $116a_{31}$, $116a_{41}$, and $116a_{51}$, and codes $116a_{22}$, $116a_{32}$, $116a_{42}$, and $116a_{52}$ into which addresses used to access a web page posting the detailed information of the products are encrypted.

Processes of the exemplary embodiment, including (1) printing operation, and (2) recording process, are described below.

(1) Printing Process

The administrator of the information processing apparatus 1 prepares the customer information 111 and the product information 112 to print information for each customer.

Figure 11:
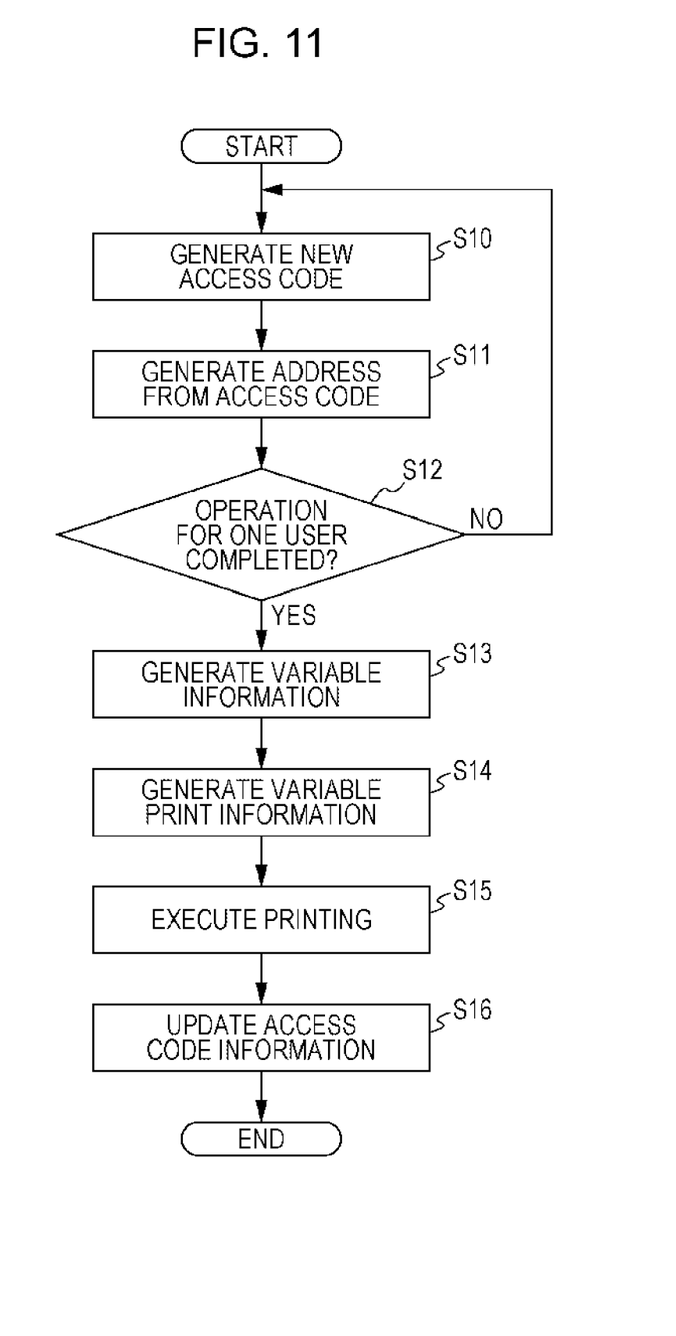
FIG. 11 is a flowchart illustrating a printing process of the information processing apparatus.

FIG. 11 is a flowchart illustrating a printing process of the information processing apparatus 1.

As illustrated in FIG. 3, the access code generation unit 100 generates an access code, such as "100200030001" uniquely identified by each piece of customer information 111 and each piece of product information 112. The access code generation unit 100 also records the generated access code on the access code information 113a (step S10).

Referring to FIG. 3, access codes "100200030001" through "100200030007" are information indicating the completion of printing, and access codes "100200030008" through "100200030010" are information indicating unexecuted printing. In step S10, other items remain blank in the access codes "100200030008" through "100200030010".

The address generation unit 101 generates an address including an access code and used to access the information processing apparatus 1, such as "http://server.com/personalized.asp?100200030001" (step S11).

The access code and address are generated on a per customer basis and on a per product basis. Printed matter describing multiple products for a single customer may be generated. Processing proceeds to step S13 if address generation for the products is completed (yes branch in step S12), otherwise processing proceeds to step S10.

The variable information generation unit 102 generates the variable information 114 by combining the customer information 111 and the product information 112 (step S13). The variable information 114 may include text information, such as "Mr. Tanaka Campaign for special customer", image information of a product, text information describing the product, and code information, such as a bar code or QR code (registered trademark), into which the access code is converted.

The variable print information generation unit 103 generates the variable print information 116 by combining the variable information 114 and the template information 115 (step S14). More specifically, the variable print information generation unit 103 generates variable print information 116a of FIG. 6 by combining the variable information 114 and the template information 115a of FIG. 4. The variable information 114 may include text information, such as "Mr. Tanaka Campaign for special customer", image information of a product, the text information describing the product, and the code information, such as the bar code or QR code (registered trademark) included in the URI for product.

The print information output unit 105 outputs the variable print information 116 to the printer 2 (step S15).

The feedback recording unit 104 records feedback information from the print information output unit 105 onto the access code information 113 (step S15). The feedback information includes the printing time and date and an identification code of the printed matter, and an identification code of a layout, and is thus recorded on access code information 113b as illustrated in FIG. 7.

Figure 7:
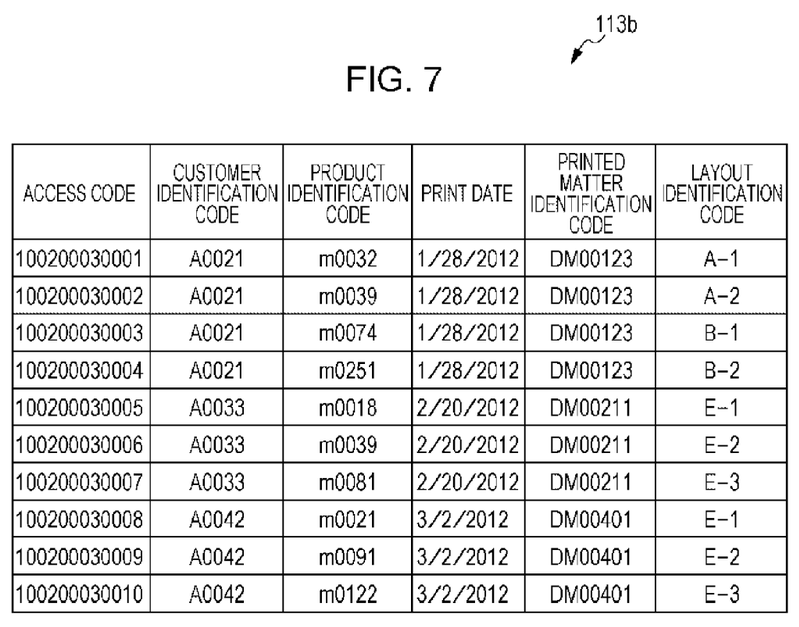
FIG. 7 diagrammatically illustrates another example of the structure of the access code information.

FIG. 7 diagrammatically illustrates another example of the structure of the access code information 113.

Access code information 113b indicates the state of the access code information 113a of FIG. 3 with the feedback information recorded thereon. Recorded in the other columns of the access codes "100200030008" through "100200030010" are the feedback information including the customer identification code, the product identification code, the printing time and date, the printed matter identification code and the layout identification code.

The printer 2 receives the variable print information 116a from the information processing apparatus 1, and then performs the printing process to result in the printed matter 20. The printed matter 20 is then delivered to the user 6 as a customer.

The user 6 receives the printed matter 20, and checks the contents of the printed matter 20. If the user 6 finds a product interesting and desires detailed information thereof, the user 6 reads a code 200 using a camera function of the terminal apparatus 3.

The terminal apparatus 3 acquires the address by reading and decoding the code 200, and then accesses the information processing apparatus 1 via the network 4 using the address.

(2) Recording Process

Figure 12:
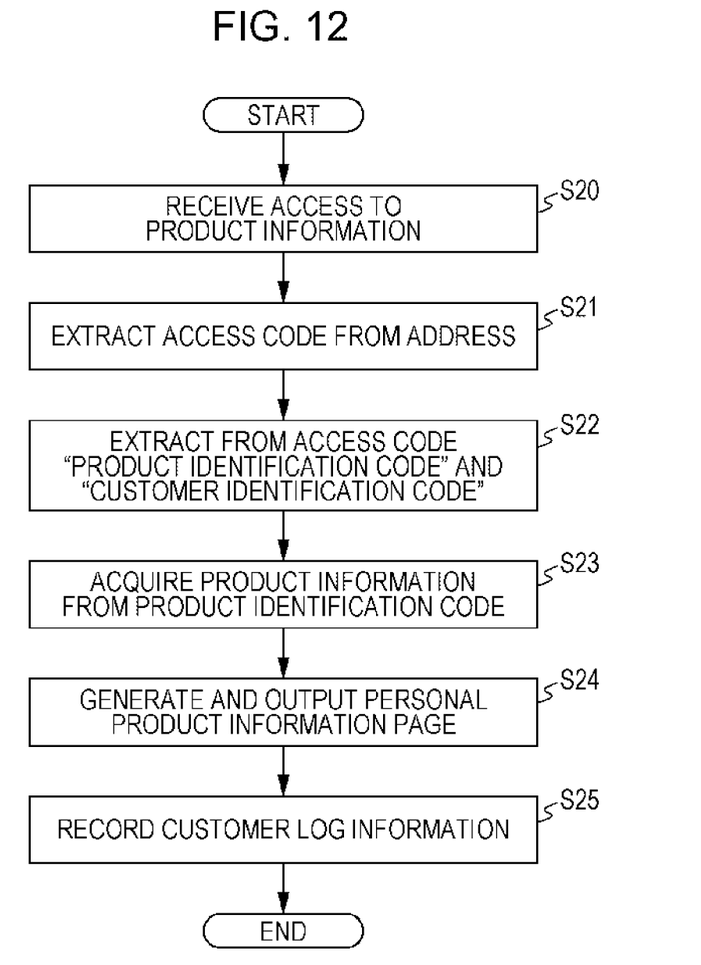
FIG. 12 is a flowchart illustrating a recording process of the information processing apparatus.

FIG. 12 is a flowchart illustrating a recording process of the information processing apparatus 1.

The information processing apparatus 1 receives an access to product information in accordance with the address that results from reading and decoding the code 200 from the terminal apparatus 3 (step S20). The address is "http://server.com/personalized.asp?100200030001".

The access code extraction unit 106 extracts the access code "100200030001" from the address "http://server.com/personalized.asp?100200030001" (step S21).

The product information output unit 108 references the access code information 113b of FIG. 7 based on the access code "100200030001" extracted by the access code extraction unit 106, and extracts a product identification code "A0021" and a customer identification code "m0032" (step S22).

The product information output unit 108 acquires information of a product corresponding to the product identification code "A0021" from the product information 112 (step S23).

The product information output unit 108 generates a product information page for the customer in accordance with the acquired information and outputs the product information page to the terminal apparatus 3 (step S24).

The terminal apparatus 3 receives the information of the product information page and display the contents of the product information page on the display.

Figure 8A:
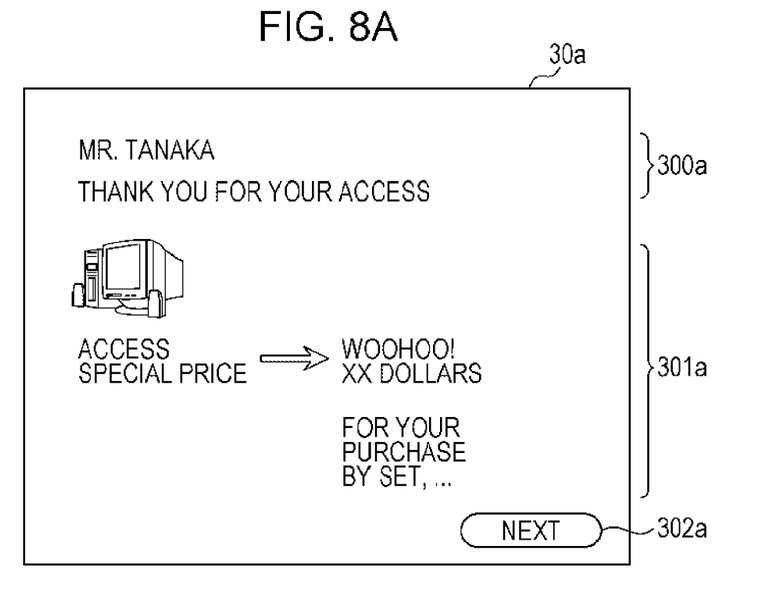
FIG. 8A and FIG. 8B diagrammatically illustrate examples of a structure of a product information page displayed on a display of a terminal apparatus.
Figure 8B:
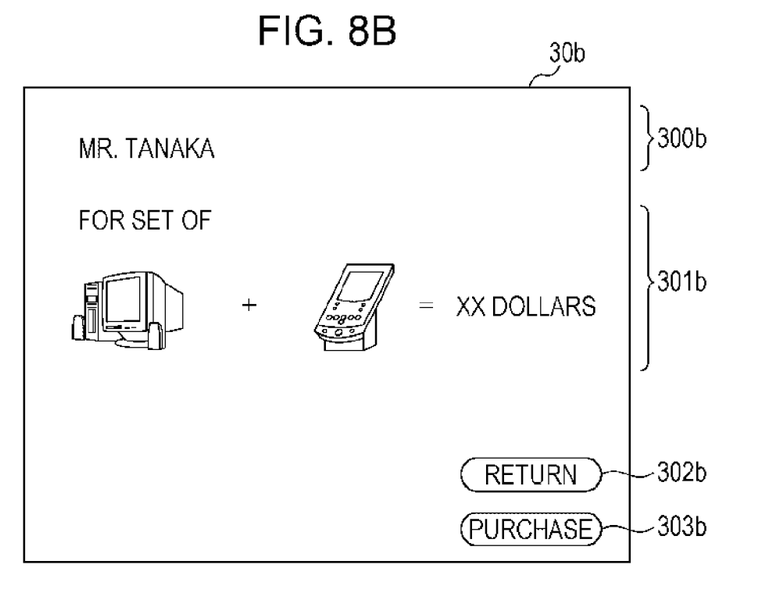

FIG. 8A and FIG. 8B diagrammatically illustrate examples of the structure of the product information page displayed on the display of the terminal apparatus 3.

As illustrated in FIG. 8A, a display screen 30a is displayed on the display of the terminal apparatus 3, and includes a message to customer 300a, product information 301a, and a detail display button 302a to request the detailed information of a product to be displayed.

As illustrated in FIG. 8B, a display screen 30b is displayed on the display of the terminal apparatus 3 if the detail display button 302a on the display screen 30a is operated. The display screen 30b includes a message to customer 300b, product information 301b, a button 302b to return to the display screen 30a, and a button 303b to purchase the product.

If a page of summary information and detailed information of a product are available as in the display screens 30a and 30b, the access code information 113a and 113b may be modified as described below.

Figure 9:
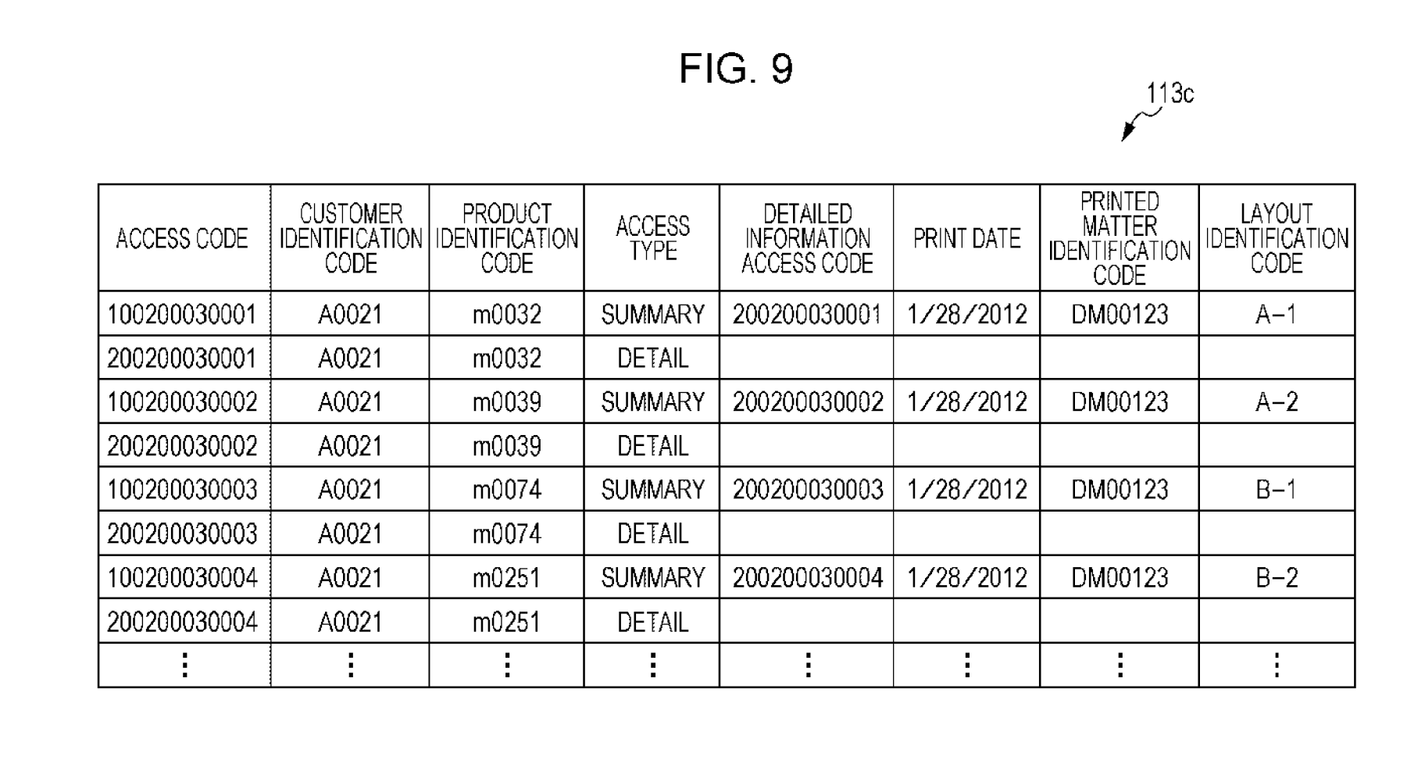
FIG. 9 diagrammatically illustrates another example of the structure of the access code information.

FIG. 9 diagrammatically illustrates another example of the structure of the access code information 113.

Access code information 113c includes, in addition to the items of the access code information 113a and 113b, an access type indicating whether the page accessing is for the summary information or the detailed information, and a detailed information access code indicating an access code of the detailed information corresponding to the summary information.

The customer log information recording unit 107 records an access log on the customer log information 117 as the access log of the customer corresponding to the customer code "m0032" responsive to the access code "100200030001" extracted by the access code extraction unit 106 (step S25). If the detail information is accessed, the log of the access code "200200030001" is recorded.

Figure 10:
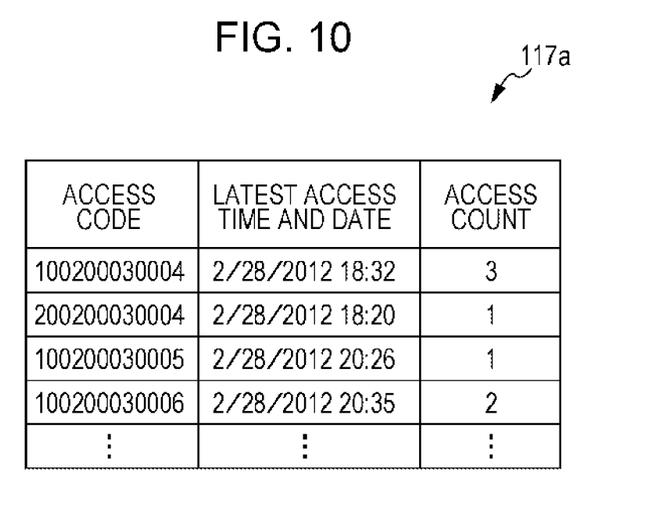
FIG. 10 diagrammatically illustrates an example of a structure of customer log information.

FIG. 10 diagrammatically illustrates an example of a structure of the customer log information 117.

Customer log information 117a includes an access code extracted by the access code extraction unit 106, the latest time and date indicating the latest time and date of access by the terminal apparatus 3, and an access count heretofore. The customer log information 117 may be managed in association with the access code information 113.

The access code uniquely determined on each piece of the customer information 111 and on each piece of the product information 112, and an item to be managed in association with the access code is included in the access code information 113. The contents of the item are successively recorded on the information processing apparatus 1. Even after the code 200 is printed, information related to the printed matter may thus be managed. An item adds to the access code information 113 even after the printing of the code.

Information, such as the "printing time and date" of the printed matter 20, the "printed matter identification code", the "layout identification code" and the like may be added. Information, such as the customer log information 117 about an access which the user 6 makes to the address using the printed matter 20 subsequent to the printing, may also be added. Information about the printed matter 20 may be tracked even after the printing.

The address includes the access code and is thus free from any item of the access code information 113. In this structure, the length of the address is not increased even if the number of items of the access code information 113 is increased. An increase in an amount of information does not lead to an increase in a print region (or a region of each of the codes $116a_{22}$, $116a_{32}$, $116a_{42}$, and $116a_{52}$ in the variable print information 116a) in the printed matter 20 of the code 200, and layout limitation is thus avoided.

Modifications

The present invention is not limited to the above-described embodiment and a variety of modifications is possible without departing from the scope and spirit of the invention.

In the embodiment, the functions of the access code generation unit 100 through the product information output unit 108 of the controller 10 are implemented using a program. Whole or part of each of the elements may be implemented using hardware, such as an application specific integrated circuit (ASIC). The program used in the embodiment may be supplied in a form recorded on a non-transitory storage medium, such as a compact disk ROM (CD-ROM). The interchanging, deletion, addition and other operations of the steps described above are possible without departing from the scope and spirit of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
an identifier generation unit configured to generate an identifier unique to a combination of, at least, destination information of a destination of printed matter and content information related to part of content to be printed on the printed matter;
an address generation unit configured to generate an address including the identifier generated by the identifier generation unit;
a print information generation unit configured to generate print information that is to be printed on the printed matter and includes the destination information, the content information, and the address generated by the address generation unit; and
a recording unit configured to record in an associated form the destination information, the content information, the identifier, and printing process result information,
wherein the printing process result information is related to the print information, and
wherein the printing process result information is generated in response to printing of the printed matter and comprises information about a process of printing the printed matter.

2. The information processing apparatus according to claim 1, further comprising:
an extraction unit configured to extract the identifier included in the address for use in access that is performed from outside in accordance with the address of the printed matter; and
an output unit configured to output the content information associated with the identifier, wherein the recording unit is configured to record an access log of an access to a storage location of the content information.

3. The information processing apparatus according to claim 2, wherein the recording unit is configured to record, as the process result information, a print result of the print information.

4. The information processing apparatus according to claim 2, wherein the print information generation unit is configured to generate the print information for variable printing in a predetermined template, based on at least the destination information, the content information, and the address.

5. The information processing apparatus according to claim 3, wherein the print information generation unit is configured to generate the print information for variable printing in a predetermined template, based on at least the destination information, the content information, and the address.

6. The information processing apparatus according to claim 1, wherein the recording unit is configured to record, as the process result information, a print result of the print information.

7. The information processing apparatus according to claim 6, wherein the print information generation unit is configured to generate the print information for variable printing in a predetermined template, based on at least the destination information, the content information, and the address.

8. The information processing apparatus according to claim 1, wherein the print information generation unit is configured to generate the print information for variable printing in a predetermined template, using at least the destination information, the content information, and the address.

9. The information processing apparatus according to claim 1, wherein the printing process result information comprises information about a time of printing the printed matter.

10. The information processing apparatus according to claim 9, wherein the printing process result information comprises an identification code of the printed matter and an identification code of a layout of the printed content.

11. The information processing apparatus according to claim 1, wherein the printing process result information comprises an identification code of the printed matter.

12. The information processing apparatus according to claim 1, wherein the printing process result information comprises an identification code of a layout of the printed content.

13. An information processing method comprising:
generating an identifier unique to a combination of, at least, destination information of a destination of printed matter and content information related to part of content to be printed on the printed matter;
generating an address including the generated identifier;
generating print information that is to be printed on the printed matter and includes the destination information, the content information, and the generated address; and
recording in an associated form the destination information, the content information, the identifier, and printing process result information,
wherein the printing process result information is related to the print information, and
wherein the printing process result information is generated in response to printing of the printed matter and comprises information about a process of printing the printed matter.

14. A non-transitory computer readable medium storing a program causing a computer to execute a process for processing information, the process comprising:
generating an identifier unique to a combination of, at least, destination information of a destination of printed matter and content information related to part of content to be printed on the printed matter;
generating an address including the generated identifier;
generating print information that is to be printed on the printed matter and includes the destination information, the content information, and the generated address; and
recording in an associated form the destination information, the content information, the identifier, and printing process result information,
wherein the printing process result information is related to the print information, and
wherein the printing process result information is generated in response to printing of the printed matter and comprises information about a process of printing the printed matter.

* * * * *